United States Patent Office 3,111,543
Patented Nov. 19, 1963

3,111,543
REACTION OF EPOXIDES WITH ALKALI METALS
Irving L. Mador and Robert E. Robinson, Cincinnati, Ohio, assignors to National Distillers and Chemical Corporation, New York, N.Y., a corporation of Virginia
No Drawing. Filed Aug. 10, 1959, Ser. No. 832,431
7 Claims. (Cl. 260—618)

The present invention relates to a novel process for preparation of alkali metal derivatives from epoxy compounds and, more particularly, to a novel process for preparation of dialkali metal compounds by reaction of an alkali metal with a 1,2-epoxy compound and the further reaction of such dialkali metal derivatives, as by reaction with Grignard type reactants, to produce highly valuable and useful compounds.

This application is a continuation in part of application Serial No. 761,283, filed September 16, 1958, and now abandoned.

In accordance with this invention, an alkali metal is reacted with a compound containing an epoxy group, at a relatively low temperature, using for the reaction a molar ratio of at least two of the alkali metal to one of the epoxy compound. From such a reaction, ring cleavage of the epoxide has been found to occur to produce a compound containing a carbon to alkali metal bond and a carbon to oxygen to alkali metal bond. Although the invention embodies a more generic scope than the use of an epoxy compound such as styrene oxide and sodium for such a reaction, the following equation illustrates a specific embodiment for preparation of a disodium derivative by use of such specific reactants in the process embodied herein:

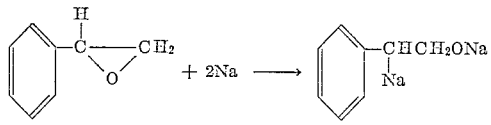

The product is sodium 2-sodio-2-phenylethoxide which, upon carbonation followed by hydrolysis, yields tropic acid (2-phenyl-3-hydroxypropanoic acid).

Thus, the process embodied herein comprises a reaction as aforesaid wherein an epoxy compound as, for example an epoxide having a

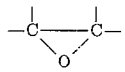

group, is cleaved by reaction with the alkali metal to produce derivatives containing the following group:

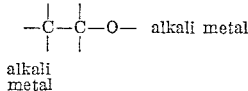

For the process embodied herein, any of the alkali metals may be used, including potassium, sodium and lithium but, preferably, because of its low cost, sodium is employed. Particularly suitable for such use are alkali metals in finely divided form dispersed in a suitable carrier that is chemically inert in the described reaction and is liquid under the conditions at which the reaction is carried out. In general, suitable for such use are substances that do not contain an active hydrogen atom, as do esters and alcohols. Thus, and for example, suitable carrier substances for the alkali metal dispersion include toluene, xylene, octane, 1,2-dimethoxyethane, 1,2-diethoxyethane, decalin, alkylate, dibutyl ether, mineral spirits, eicosane, and the like.

As aforesaid, the process embodied herein utilizes an epoxy compound which, under the conditions of the described reaction, has been found to undergo ring-opening to form the aforedescribed dialkali metal derivatives. Thus, epoxides for practice of this invention include compounds of the structure

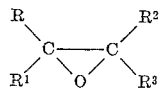

wherein R, R$^1$, R$^2$ and R$^3$ can be hydrogen, such as in ethylene oxide; wherein R, R$^1$ and R$^2$ can be hydrogen and R$^3$ an alkene group such as in butadiene monoepoxide or where R$^3$ may be an alkyl group as in propylene oxide, or where R and R$^3$ may be aliphatic as in butene-2 oxide, or where R$^3$ may be aromatic as in styrene oxide, and homologs thereof such as in α-methylstyrene oxide. Still other epoxy compounds for such a reaction include compounds of the foregoing structures which contain a hydrocarbon ring, as in cyclohexane oxide, or a heterocyclic group, such as epoxyethylpyridine, epoxyethyltetrahydrofuran, and the like, and also, epoxy compounds that contain functional groups such as in epichlorohydrin or from an epoxidized fatty acid (e.g., epoxy oleic) as well as salts and esters thereof. Thus, and as aforesaid, the invention is in general directed to use of epoxy compounds which may or may not contain substituted groups as aforedefined for illustrative purposes as, under the conditions under which the process embodied herein is carried out, the epoxy grouping has been found to undergo ring opening and formation of the defined dialkali metal derivative.

Regarding the relative amounts of reactants to employ to obtain the results embodied herein, use is made of at least two moles of the alkali metal per mole of the epoxy compound. That is, and based on the total amount of epoxy compound that is ultimately employed, it is preferable to use until completion of the reaction a total of at least two moles of the alkali metal per mole of the epoxy compound. However, a substantial excess of the alkali metal can be used such as, for example, from about 2.0 to about 4.0 g. atoms per mole of the epoxy compound and, more specifically, from about 2.0 to 2.2 g. atoms of alkali metal per mole of the epoxy compound.

The process embodied herein is carried out at a temperature of below about 0° C. and preferably at below −20° C. as, at such relatively low temperatures, the epoxy compounds have been found to undergo the aforedescribed ring-opening and formation of the dialkali metal derivatives.

In carrying out the aforesaid reaction, the alkali metal is preferably reacted with the epoxy compound in presence of a reaction medium that, at the conditions under which the reaction is carried out, is liquid and is chemically inert. For such a purpose, substances such as organic ethers, tertiary amines, and the like, may be used as well as mixtures of such substances. Of such substances, organic ethers represent preferred embodiments with examples thereof including ethers such as tetrahydrofuran, dimethyl ether, 1,2-dimethoxyethane, dioxane, methyl ethyl ether, methyl propyl ether, and others, whereas tertiary amines include trimethylamine, N-methylmorpholine, etc.

The dialkali metal derivatives containing both a carbon to alkali metal bond and a carbon-oxygen-alkali metal bond, as produced by the process embodied herein, undergo reaction at the carbon-alkali metal group with a variety of reactants, and particularly, Grignard reactants to produce highly valuable and useful derivatives. Thus, by reaction of the dialkali metal derivative with carbon dioxide, the

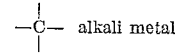

group is converted to a

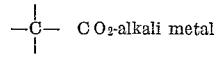

group which, upon hydrolysis, is converted to a carboxylic acid. Thus, for example, in the reaction between styrene oxide and sodium to form the compound

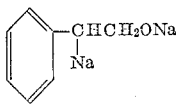

reaction thereof with $CO_2$ produces

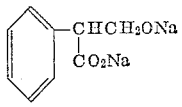

which, on hydrolysis, results in tropic acid.

By further reaction of such dialkali metal derivative containing the

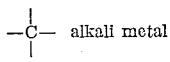

group with an epoxy compound, ring cleavage of the epoxy compound is produced with formation of a dialkali metal salt of a diol. In specific illustration, and by reaction of an epoxy compound such as styrene oxide with the dialkali metal product from the initial reaction of styrene oxide with sodium, the following disodio salt is obtained and which upon hydrolysis, yields 2,3-diphenyl-1,4-butanediol.

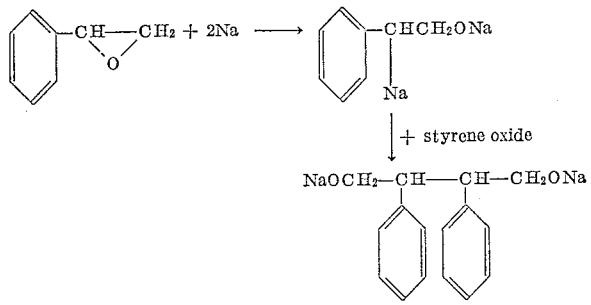

By use of the epoxy compounds other than styrene oxide for the initial reaction, or in the subsequent reaction, or by use of the same or different epoxides in such reactions, there occurs initial formation of the dialkali metal derivatives containing both a carbon to alkali metal group and a carbon-oxygen-alkali metal group, followed by, in the second reaction, formation of a dialkali metal salt of a diol on the order illustrated by the specific use of styrene oxide in both of the aforesaid reactions. Thus, examples of epoxy compounds for use in both the first and second of the described reactions, or in either one of said reactions, to produce glycols comprise styrene oxide, ethylene oxide, propylene oxide, isobutylene oxide, butadiene monoxide, and others. In addition to the aforesaid carbonation and epoxide reactions for conversion of the compounds containing the

group to valuable derivatives, such compounds can be reacted with many other Grignard type reactants having groups including carbonyl, thionyl, nitrile groups, and others. Specific illustrations include chloramine, nitrosyl chloride, aldehydes (e.g., formaldehyde), ketones (e.g., acetone), sulfur dioxide, benzene sulfonyl chloride, thionyl chloride, acetonitrile, propionitrile, etc.

Thus, the product from the initial reaction between the epoxy compound and alkali metal can be reacted in typical Grignard manner with sulfur dioxide to form hydroxylsulfinic acids, with formaldehyde to diols, with cyanogen chloride to hydroxynitriles, or used generally as a Grignard type reactant in reactions with esters, acid anhydrides, aldehydes, ketones and nitriles. In addition, reactions with water, oxygen, and organic halides are suitable and are considered as common Grignard reactions.

The product of the initial reaction between the epoxy compound and alkali metal, e.g., sodium, can be used as a transmetalating agent, converting aryl- or vinylmethanes to the corresponding aryl- or vinylmethylsodium. Thus, for example, toluene is converted to benzylsodium, propylene to allylsodium, etc. In all such cases the sodium attached to carbon in the disodiumepoxide adduct is replaced by hydrogen and an alcohol, such as in the case of styrene oxide, β-phenylethanol results.

Also the carbon-sodium linkage in the disodium-epoxide adduct adds across certain reactive unsaturated groups as, for example, those in butadiene and styrene. In such cases, higher hydroxy acids are produced on carbonation with one or more units of the olefin being incorporated in the acid molecule.

In order to further describe the reaction, the following embodiments are set forth for purposes of illustration and not limitation. In the embodiments, the reactions were carried out under an atmosphere of nitrogen.

EXAMPLE 1

*Preparation of Sodium 2-Sodio-2-Phenylethoxide and Conversion Thereof to Tropic Acid*

An oven-dried 1000 ml. flask was equipped with a dropping funnel, a paddle-type stirrer, and a low temperature dial thermometer. To the flask were added 350 ml. of tetrahydrofuran and 0.38 g. atom of sodium in the form of a 25% dispersion of sodium particles (average of 1 to 3 microns) in decalin. The mixture was cooled to −30° C., and 1.0 g. of p-terphenyl in 50 ml. of tetrahydrofuran was added batchwise from the dropping funnel with stirring. The mixture was cooled to −75° C., and 22.8 g. (0.19 mole) of styrene oxide in 100 ml. of tetrahydrofuran was introduced at a uniform rate over a period of 42 minutes and stirred for an additional ten minutes at −75° C. thereby providing a reaction mixture comprising sodium 2-sodio-2-phenylethoxide.

Carbonation of the stated phenylethoxide to tropic acid was achieved as follows: The thermometer was replaced by a goose-neck and the reaction product was poured onto several hundred grams of crushed Dry Ice in a 2000 ml. 3-necked flask. A single rinse of the reaction flask with tetrahydrofuran was added to the Dry Ice slurry. The carbonation vessel was fitted with a stirrer, a nitrogen inlet, a thermometer and a dropping funnel. The mixture was allowed to stand until it had warmed to room temperature, then was treated with 250 ml. of water to destroy any excess sodium. The resulting mixture consisted of two liquid phases and a white precipitate. The latter (sodium carbonate) was removed by filtration. The aqueous solution was then boiled in an open beaker until no evidence of volatile organic materials persisted. The solution was acidified with concentrated hydrochloric acid and extracted with four 100 ml. portions of diethyl ether. The combined ether extracts were stripped of solvent and the solid residue dried at 65° C. under vacuum to yield 18.0 g. (57%) of tropic acid, M.P. 113–116° C. On recrystallization from water, the material melted at 118–118.5° C. which is the recorded melting point of tropic aicd. It gave no melting point depression with commercial tropic acid, and its infrared absorption spectrum was substantially superimposable with that of the authentic material.

|  | C | H | Neutral Equivalent |
|---|---|---|---|
| Elemental Analysis: |  |  |  |
| Calcd. for $C_9H_{10}O_3$ | 65.05 | 6.03 | 166.2 |
| Found | 65.26 | 6.37 | 168.2 |

EXAMPLE 2

2-Phenyl-1,4-Butanediol

A suspension of sodium 2-sodio-2-phenylethoxide in tetrahydrofuran was prepared as in Example 1 from 14.5 g. (0.12 mole) of styrene oxide and 0.48 g. atom of sodium dispersion. Into the stirred suspension was passed 5.5 g. of gaseous ethylene oxide at −75° C. over 9 minutes. The mixture was stirred for 24 minutes at −75° C., then allowed to warm to −10° over 48 minutes. The excess sodium was then destroyed by the cautious addition of 25 g. of ammonium chloride in 200 ml. of water. The mixture was transferred to a separatory funnel and the organic layer collected and combined with one diethyl ether extract of the water layer. The organic solvents were removed by heat and suction. The mixture was then distilled with steam until no further organic distillate was collected. The residue was extracted with several portions of diethyl ether and the ether removed by heat and suction. Distillation under reduced pressure yielded 7.6 g. (39%) of 2-phenyl-1,4-butanediol, B.P. 144–146°/12 mm. The product gave a bis-phenylurethane, M.P. 122–123° C., recrystallized from hexane-benzene; reported M.P. 114° C.

|  | Percent C | Percent H | Percent N |
|---|---|---|---|
| Analysis: |  |  |  |
| Calcd. for glycol | 72.26 | 8.49 |  |
| Found | 72.30 | 8.65 |  |
| Calcd. for phenylurethan | 71.27 | 5.98 | 6.93 |
| Found | 71.62 | 6.09 | 6.87 |

EXAMPLE 3

2,3-Diphenyl-1-Propanol

A suspension of sodium 2-sodio-2-phenylethoxide in tetrahydrofuran was prepared from 0.49 g. atom of sodium and 29.0 g. (0.24 mole) of styrene oxide. At −60° to −75° C., 63.3 g. (0.5 mole) of benzyl chloride was added over 10 minutes, the color of the mixture changing from blue to brown during the addition. The mixture was stirred 10 minutes after the addition was complete, then allowed to warm to room temperature with stirring. Although the material appeared to contain no residual sodium it was treated cautiously with 150 ml. of water. The organic layer was collected in a separatory funnel and washed with 100 ml. of water. The volatile organic materials were then removed by distillation with steam and the residue extracted several times with ether. Concentration of the ether and two distillations under reduced pressure yielded 19.4 g. of oil, B.P. 175–185°/1 mm., having an infrared spectrum of a phenylated aliphatic alcohol, and which gave the following values on elemental analysis corresponding to those for 2,3-diphenyl-1-propanol.

|  | Percent C | Percent H |
|---|---|---|
| Analysis: |  |  |
| Calcd. for $C_{15}H_{20}O$ | 84.89 | 7.60 |
| Found | 86.03 | 7.67 |

EXAMPLE 4

β-Phenylethanol

A suspension of sodium 2-sodio-2-phenylethoxide in 500 ml. of tetrahydrofuran was prepared from 0.376 g. atom of dispersed sodium in mineral spirits and 22.6 g. (0.188 mole) of styrene oxide. The mixture was hydrolyzed by the cautious addition of 25 ml. of water in 25 ml. of tetrahydrofuran at −40°. When the material had warmed to room temperature it was treated with 100 ml. of saturated aqueous sodium chloride. The upper organic layer was collected, combined with an ether rinse of the aqueous phase, and stripped of tetrahydrofuran by heat and suction. The residue consisted of two phases, the heavier of which was twice distilled under vacuum (B.P. 135–140°/60 mm.). Each time a small amount of mineral spirits separated out of the distillate and was discarded. The β-phenylethanol thus obtained weighed 12.4 g. (54%) and was shown to be of at least 95% purity by its infrared spectrum.

EXAMPLE 5

A suspension of sodium 2-sodio-2-phenylethoxide in tetrahydrofuran was prepared from 28.8 g. (0.24 mole) of styrene oxide and 0.48 g. atom of sodium dispersed in mineral spirits. To this was added 50.0 g. (0.48 mole) of styrene over 14 minutes at −75° C. The mixture was warmed to −25° C. and stirred one hour at that temperature, then carbonated on Dry Ice by the method described in the preparation of tropic acid. After the excess carbon dioxide had evaporated, the unreacted sodium was destroyed by the cautious addition of 300 ml. of water. The aqueous layer was collected, washed once with benzene and boiled on a hot plate for one hour. It was then cooled, acidified with concentrated hydrochloric acid, and extracted several times with diethyl ether. Evaporation of the ether followed by drying at 65° C. under vacuum yielded 19.0 g. of acidic material, M.P. 90–104, N.E. 214. This was suspended in 100 ml. of boiling water, then filtered hot. The tarry material on the filter consisted of 6.5 g. (8.4%) of acid, N.E. 322. Evaporation of the aqueous filtrate yielded 11.5 g. (29%) of tropic acid, M.P. 111–115° C.

EXAMPLE 6

A suspension of sodium 2-sodio-2-phenylethoxide in tetrahydrofuran was prepared from 28.0 g. (0.23 mole) of styrene oxide and 0.48 g. atom of sodium dispersed in mineral spirits. Butadiene (13.0 g., 0.24 mole) was passed into the flask over 28 minutes at −75° C. After being stirred for one hour at −75° C., the mixture was carbonated on Dry Ice by the procedure described in the preparation of tropic acid. When the excess carbon dioxide had evaporated, the unreacted sodium was destroyed by the cautious addition of 250 ml. of water. The water layer was collected, washed once with benzene, and boiled one hour on a hot plate. After being cooled to room temperature, the solution was acidified with concentrated hydrochloric acid and extracted several times with ether. The ether was removed by evaporation, and the residue dried to constant weight at 65° C., under vacuum to yield 30.5 g. of liquid acid, N.E. 223. This was dissolved in dilute caustic and hydrogenated over 5% palladium on carbon at 50 p.s.i.g. The solution was filtered free of catalyst, acidified, and the acidic material recovered. The acid recovered (25 g., N.E. 225) gave an infrared spectrum characteristic of a phenylated, hydroxylated aliphatic acid.

Repetition of the experiment with 2 moles of butadiene per mole of styrene oxide gave similar results, the product having a neutralization equivalent of 336.

EXAMPLE 7

Under an atmosphere of nitrogen, 0.376 g. atom of finely dispersed sodium (1–3 microns) in mineral spirits was charged into a 1000 ml. 3-necked flask, equipped with paddle-type stirrer, thermometer and dropping funnel. The dispersion was diluted with 400 ml. of tetrahydrofuran and cooled to −75° C. and, with stirring, 22.6 g. (0.19 mole) of styrene oxide in 100 ml. of tetrahydrofuran was introduced over 45 minutes at −75° C., followed by stirring for an additional ten minutes.

The reaction product, comprising sodium 2-sodio-2-phenylethoxide, was subjected to carbonation with Dry Ice and treated as set forth in Example 1 whereby, as in Example 1, tropic acid was obtained.

EXAMPLE 8

A 1000 ml. 3-necked flask was charged with 41.2 g.

(0.53 g. atom) of a 50% dispersion of potassium in mineral spirits and 300 ml. of tetrahydrofuran. The flask was fitted with a paddle-type stirrer, a dropping funnel, and a thermometer. After having been cooled to −20° C., the mixture was treated with a solution of 1.0 g. of p-terphenyl in 100 ml. of tetrahydrofuran. A deep violet color appeared immediately. A solution of 32 g. (0.265 mole) of styrene oxide in 100 ml. of tetrahydrofuran was added from the dropping funnel to the stirred suspension over 60 minutes, the temperature of the medium being held at −70° C. by external cooling. After a ten minute stirring period, a stream of carbon dioxide was passed into the flask at −60 to −70° C. for 30 minutes. The resulting carbonation mixture was allowed to warm to room temperature, then treated with 350 ml. of water. By the isolation procedure described in Example 1, the aqueous layer yielded 24.5 g. (56%) of tropic acid, M.P. 113–115° C.

EXAMPLE 9

By the procedure of Example 1, except that 350 ml. of 1,2-dimethoxyethane was used instead of tetrahydrofuran, sodium 2-sodio-2-phenylethoxide was prepared from 0.42 g. atom of dispersed sodium, 25.0 g. (0.21 mole) of styrene oxide, and 1.0 g. of p-terphenyl. Carbonation yielded 22 g. (61%) of tropic acid.

EXAMPLE 10

By the procedure of Example 1, sodium 2-sodio-2-phenylethoxide was prepared from 0.38 g. atom of dispersed sodium, 22.8 g. (0.19 mole) of styrene oxide and 1.0 g. of p-terphenyl, the temperature being held at −30° C., during the styrene oxide addition. Carbonation yielded 12.3 g. (39%) of tropic acid.

EXAMPLE 11

Following the procedure of Example 1, 18.3 g. (0.26 mole) of butadiene monoxide in 100 ml. of tetrahydrofuran was added to 1.04 g. atom of dispersed sodium in 350 ml. of tetrahydrofuran at −75° C. over a period of 65 minutes. The resulting reaction mixture was stirred for 10 minutes and then treated for one hour with gaseous carbon dioxide at −70 to −75° C. The mixture was then warmed to room temperature and excess sodium destroyed by the addition of 150 ml. of water. The mixture was then transferred to a separatory funnel and the aqueous layer collected and combined with a 50 ml. water extract of the organic phase. The aqueous solution was washed with 100 ml. of benzene and then boiled to remove volatile organic matter. The solution was acidified with concentrated hydrochloric acid and extracted several times with diethyl ether. Evaporation of the ether gave 8.5 g. of an acidic liquid having infrared spectrum absorption characteristic of hydroxyl, carboxyl and olefinic unsaturation. The crude material (hydroxypentenoic acid) had a neutralization equivalent of 106 (theory 116).

The various diols prepared by the process embodied herein find utility in the preparation of polyesters, polyurethanes, "Thiokol" rubbers and plasticizers or as components of automobile antifreezes, hydraulic fluids, and insect repellants.

Acids obtained by oxidation of the diols are useful in the preparation of polyesters, polyamides and detergents, whereas hydroxy acids, as for example those obtained as products of the carbonation of the disodium-epoxide adducts, find utility in the synthesis of alkaloids, polyesters and polyamides.

In preferred embodiment, the aforesaid reaction is carried out in the presence of a relatively small amount of a compound of the polycyclic aromatic class and, particularly, to obtain optimum yields of the desired product when the alkali metal reactant is used in a form that is not as active as extremely finely divided alkali metal dispersions. Hence, though use of such polycyclic aromatics is not essential but is preferred, compounds suitable therefor when used include condensed ring hydrocarbons such as naphthalene and phenanthrene, as well as the uncondensed polycyclic compounds such as diphenyl, the terphenyls, dinaphthyl, tetraphenyl ethylene and the like. Other compounds for such use include diaryl ketones as, for example, benzophenone. When used, the amount of the polycyclic aromatic compound may be varied over a rather wide range but which is relatively small in relationship to the amount of the epoxy reactant. Generally, concentrations in the range of 0.1 to 10 weight percent based on the amount of the epoxy compound is satisfactory.

While there are above disclosed but a limited number of embodiments of the process of the invention herein presented, it is possible to produce still other embodiments without departing from the inventive concept here in disclosed, and it is desired therefore that only such limitations be imposed on the appended claims as are stated therein.

What is claimed is:

1. A process for the preparation, from a 1,2 carbon epoxy compound, of compounds having an alkali metal bond to the No. 1 carbon and an alkali metal to oxygen bond through the oxygen to the No. 2 carbon which comprises reacting a 1,2-epoxy compound selected from the group consisting of ethylene oxide, butadiene monoepoxide, propylene oxide, butene-2-oxide, styrene oxide, α-methyl styrene oxide, cyclohexene oxide, epoxyethylpyridine, epoxyethyltetrahydrofuran, epichlorhydrin, and epoxyoleic acid, in an inert liquid organic ether reaction medium selected from the group consisting of tetrahydrofuran, dimethyl ether, and methyl propyl ether, at a temperature below about 0° C. with at least two moles of an alkali metal per mole of said epoxy compound, whereby the epoxy compound is ring-cleaved at the epoxy group with the formation of a compound having a carbon-to-alkali metal bond and a carbon-to-oxygen-to-alkali metal bond as set forth above.

2. A process, as defined in claim 1, wherein the alkali metal is sodium, the epoxy compound is styrene oxide, and the reaction product is sodium 2-sodio-2-phenylethoxide.

3. A process, as defined in claim 1, wherein the alkali metal is sodium.

4. A process, as defined in claim 1, wherein the alkali metal reactant is employed in an amount of from at least two moles to about four moles per mole of the epoxy compound.

5. A process as defined in claim 1, wherein the alkali metal reactant is employed in from at least two moles to about four moles of finely-divided sodium per mole of said epoxy compound.

6. A process, as defined in claim 1, wherein the alkali metal is potassium.

7. A process, as defined in claim 1, wherein the reaction is carried out in presence of a small amount, based on the weight of the epoxy compound, of a polycyclic aromatic compound selected from the group consisting of condensed ring hydrocarbons, uncondensed polycyclic hydrocarbons, and benzophenone.

References Cited in the file of this patent

UNITED STATES PATENTS 1,966,488     Dorrer et al.  ----------- July 17, 1934

OTHER REFERENCES

Staudinger et al.: Ber. Deut. Chem., vol. 62B, 2402 (1929) (1 page).

Wagner et al.: "Synthetic Organic Chemistry," pages 9, 424 (2 pages).